(12) United States Patent
Chiba

(10) Patent No.: US 7,656,645 B2
(45) Date of Patent: Feb. 2, 2010

(54) ELECTROLYTIC SOLUTION FOR ELECTRIC DOUBLE LAYER CAPACITOR AND ELECTRIC DOUBLE LAYER CAPACITOR

(75) Inventor: Kazumi Chiba, Shibukawa (JP)

(73) Assignee: Japan Carlit Co., Ltd., Tokyo (JP)

( * ) Notice: Subject to any disclaimer, the term of this patent is extended or adjusted under 35 U.S.C. 154(b) by 12 days.

(21) Appl. No.: 10/592,536

(22) PCT Filed: Jul. 27, 2004

(86) PCT No.: PCT/JP2004/011009
§ 371 (c)(1),
(2), (4) Date: Sep. 12, 2006

(87) PCT Pub. No.: WO2005/088656
PCT Pub. Date: Sep. 22, 2005

(65) Prior Publication Data
US 2007/0194266 A1    Aug. 23, 2007

(30) Foreign Application Priority Data
Mar. 12, 2004 (JP) ............................. 2004-070394
Mar. 12, 2004 (JP) ............................. 2004-070395

(51) Int. Cl.
*H01G 9/00* (2006.01)
*H01G 9/02* (2006.01)
*H01M 6/04* (2006.01)

(52) U.S. Cl. ................. 361/502; 361/504; 361/505; 252/62.2

(58) Field of Classification Search ............ 361/502, 361/503, 504, 505; 252/62.2
See application file for complete search history.

(56) References Cited

U.S. PATENT DOCUMENTS

| 4,740,433 | A * | 4/1988 | Lu .................................. 429/94 |
| 4,862,328 | A * | 8/1989 | Morimoto et al. ............ 361/502 |
| 6,589,690 | B1 * | 7/2003 | Sato et al. ..................... 429/162 |
| 7,154,737 | B2 * | 12/2006 | Maruo et al. ................. 361/502 |
| 2004/0002002 | A1 * | 1/2004 | Mizuta et al. ................ 429/188 |

FOREIGN PATENT DOCUMENTS

| JP | 63-215031 | 8/1988 |
| JP | 2 69916 | 3/1990 |
| JP | 02-240910 | 9/1990 |
| JP | 04-196511 | 7/1992 |
| JP | 06-020520 | 1/1994 |
| JP | 11-224831 | 8/1999 |
| JP | 2000 114105 | 4/2000 |
| JP | 2000 208372 | 7/2000 |
| JP | 2000-223121 | 8/2000 |
| JP | 2001-319837 | 11/2001 |
| JP | 2002-289468 | 10/2002 |
| JP | 2003-243260 | 8/2003 |
| JP | 2003 324038 | 11/2003 |
| WO | WO 02/21631 | 3/2002 |

* cited by examiner

*Primary Examiner*—Eric Thomas
*Assistant Examiner*—David M Sinclair
(74) *Attorney, Agent, or Firm*—Oblon, Spivak, McClelland, Maier & Neustadt, L.L.P.

(57) ABSTRACT

An electrolytic solution for an electric double layer capacitor comprising a quaternary ammonium salt in a mixed solvent containing ethylene carbonate and propylene carbonate as an electrolyte. The electrolytic solution for electric double layer capacitor has a low coefficient of viscosity, has an excellent low temperature characteristics of not coagulating at a low temperature, possesses high electrical conductivity over a wide temperature range, and has a long-term reliability.

6 Claims, 1 Drawing Sheet

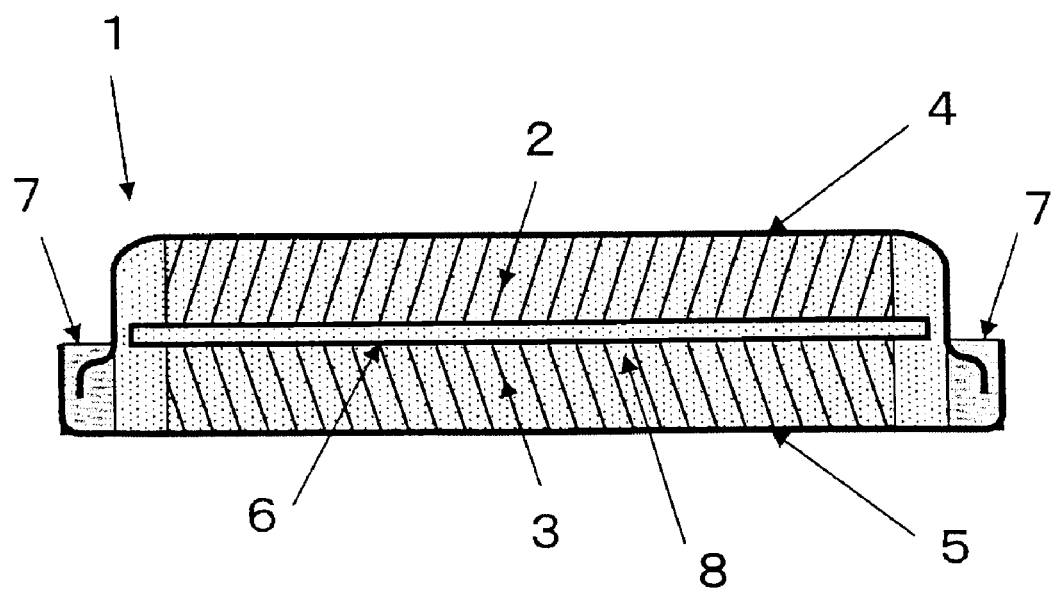

ELECTROLYTIC SOLUTION FOR ELECTRIC DOUBLE LAYER CAPACITOR AND ELECTRIC DOUBLE LAYER CAPACITOR

TECHNICAL FIELD

The present invention relates to an electrolytic solution for an electric double layer capacitor and an electric double layer capacitor, and in particular, to an electrolytic solution for an electric double layer capacitor excelling in low temperature characteristics and the like and to an electric double layer capacitor.

BACKGROUND ART

An electric double layer capacitor is a charge accumulation device utilizing an electric double layer formed at the interface of polarizable electrodes and an electrolytic solution.

When the electrolytic solution used in an electric double layer capacitor possesses a high coefficient of viscosity or a low electric conductivity, the internal resistance of the electric double layer capacitor increases thereby decreasing the voltage of the capacitor during charging and discharging. Therefore, an electrolytic solution used in an electric double layer capacitor is required to possess a low viscosity and a high electric conductivity. In addition, the electrolytic solution is required to be durable over a long period of time.

Conventionally, in view of ensuring long term durability, electrolytic solution for use in electric double layer capacitors comprising a quaternary ammonium salt such as triethylmethylammonium tetrafluoroborate (hereinafter referred to as "TEMA-BF$_4$") dissolved in propylene carbonate (hereinafter referred to as "PC") has been used (e.g. Japanese Patent Application Laid-open No. 2000-114105).

However, due to a high coefficient of viscosity of about 2.5 mPa·s at 30° C. possessed by the PC solvent, the electrolytic solution in which an electrolyte is dissolved in this solvent has a problem of a high coefficient of viscosity and a low conductivity, resulting in a large internal resistance of the electric double layer capacitor produced using this electrolytic solution.

For this reason, an electrolytic solution for an electric double layer capacitor having a low coefficient of viscosity, excellent low-temperature characteristics, and high long-term reliability has been desired.

An object of the present invention is to provide an electrolytic solution for use in an electric double layer capacitor possessing a low coefficient of viscosity and excellent low-temperature characteristics, i.e. exhibiting a high conductivity without coagulating over a wide temperature range including a low temperature range and having superior long-term reliability, and to provide an electric double layer capacitor using this electrolytic solution.

DISCLOSURE OF THE INVENTION

As a result of extensive studies, the present inventor has discovered that an electrolytic solution prepared by dissolving a quaternary ammonium salt in a mixed solvent containing at least ethylene carbonate (hereafter abbreviated to as "EC") and PC, as an electrolyte, has a low coefficient of viscosity, does not coagulate in a low-temperature region, exhibits a high conductivity over a wide temperature range, and thus possesses excellent long-term reliability. This finding has led to the completion of the present invention.

Specifically, the present invention provides an electrolytic solution for an electric double layer capacitor comprising a quaternary ammonium salt in a mixed solvent containing EC and PC as an electrolyte.

The present invention also provides an electric double layer capacitor using this electrolytic solution.

BRIEF DESCRIPTION OF THE DRAWINGS

FIG. 1 illustrates a cross-sectional view of an example of the structure of the electric double layer capacitor.

The following is an explanation of the symbols used in the FIGURE.

1 Electric double layer capacitor
2 Primary electrode (negative)
3 Secondary electrode (positive)
4 Primary container body
5 Secondary container body
6 Separator
7 Non-conductive material
8 Electrolytic solution

BEST MODE FOR CARRYING OUT THE INVENTION

The electrolytic solution for an electric double layer capacitor of the present invention comprises a quaternary ammonium salt dissolved as an electrolyte in a mixed solvent containing at least EC and PC.

Commercially available products can be used as the EC and PC in the above mixed solvent.

Although the ratio by volume of EC and PC in the mixed solvent is not specifically limited insofar as the solvent can sufficiently dissolve a quaternary ammonium salt, can produce an electrolytic solution having a low coefficient of viscosity, and causes the electrolytic solution to coagulate only with difficulty even at a low temperature, the ratio of EC:PC is preferably from 20:80 to 40:60, and particularly preferably from 25:75 to 35:65, with an optimum ratio being 30:70.

On the other hand, although any materials being able to function as an electrolyte and having certain low-temperature characteristics and voltage resistance effects can be used as the quaternary ammonium salt used in the present invention without any specific limitations, a compound shown by the following formula (1) is preferably used.

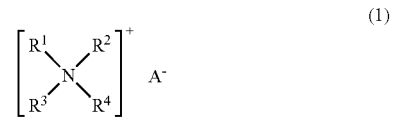

(1)

wherein $R^1$ to $R^4$ individually represent an alkyl group or $R^1$ and $R^2$ and/or $R^3$ and $R^4$ may form a ring in combination, and $A^-$ represents a counter anion.

Although there are no specific limitations to the alkyl groups represented by $R^1$ to $R^4$ in the above formula (1), the alkyl groups, which may be either the same or different, preferably have 1 to 3 carbon atoms, with a methyl group or ethyl group being particularly preferable.

There are also no specific limitations to the ring formed by $R^1$ and $R^2$ and/or $R^3$ and $R^4$ in combination. A preferable ring is a 4 to 8 member ring, with a particularly preferable ring being pyrrolidine, which is a 5 member compound, or piperidine, which is a 6 member compound.

Either a quaternary ammonium salt in which $R^1$ and $R^2$ form a ring and $R^3$ and $R^4$ are alkyl groups or a quaternary ammonium salt in which both the combination of $R^1$ and $R^2$ and the combination of $R^3$ and $R^4$ form a ring can be used as the quarternary ammonium salt (1) of the present invention.

There are no restrictions to the counter anion of $A^-$ in the quaternary ammonium salt (1). Examples of the counter anion include a tetrafluoroboric acid anion, hexafluorophosphoric acid anion, perchloric acid anion, bistrifluoromethanesulfonimide anion, and the like. Of these, the tetrafluoroboric acid anion is particularly preferable due to the excellent degree of electrolytic dissociation, economical efficiency, and the like.

As preferable specific examples of the quaternary ammonium salt (1) used in the present invention, triethylmethylammonium tetrafluoroborate, diethyldimethylammonium tetrafluoroborate, ethyltrimethylammonium tetrafluoroborate, dimethylpyrrolidinium tetrafluoroborate, diethylpyrrolidinium tetrafluoroborate, ethylmethylpyrrolidinium tetrafluoroborate, spiro-(1,1')-bipyrrolidinium tetrafluoroborate, dimethylpiperidinium tetrafluoroborate, diethyl piperidinium tetrafluoroborate, spiro-(1,1')-bipiperidinium tetrafluoroborate, piperidine-1-spiro-1'-pyrrolidinium tetrafluoroborate, and the like can be given.

Of these, triethylmethylammonium tetrafluoroborate, spiro-(1,1')-bipyrrolidinium tetrafluoroborate of the following formula (2), piperidine-1-spiro-1'-pyrrolidinium tetrafluoroborate of the following formula (3), and the like are particularly preferable.

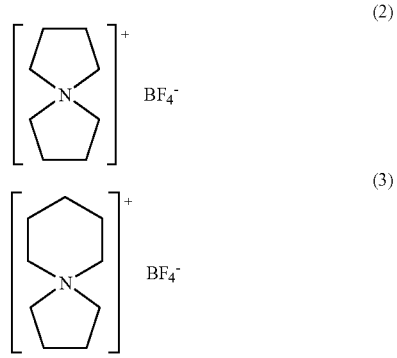

The concentration of the quaternary ammonium salt (1) in the electrolytic solution of the present invention is preferably from 0.5 to 3 mol/l, particularly preferably from 0.8 to 2.5 mol/l, and still more preferably from 1.0 to 2.0 mol/l of the electrolytic solution.

If the concentration of the quaternary ammonium salt is less than 0.5 mol/l, the conductivity may be insufficient; if more than 3 mol/l, the low temperature performance and economical efficiency may be impaired.

In the preparation of the electrolytic solution of the present invention, if necessary, auxiliary solvents may be used in addition to a mixed solvent of EC and PC, which is an essential component. As the auxiliary solvent, an aprotic polar solvent is preferable. As examples, lactones such as γ-butyrolactone and γ-valerolactone, nitriles such as acetonitrile and propionitrile, sulfones such as sulfolane, and the like can be given. These auxiliary solvents are used together with the mixed solvent of EC and PC to an extent not interfering with the excellent effects of the mixed solvent, in an amount of preferably from 0 to 30 parts by volume, and particularly preferably from 10 to 20 parts by volume per 100 parts by volume of EC and PC.

The electrolytic solution of the present invention described above can be suitably used as an electrolytic solution for electric double layer capacitors. There are no particular limitations to the shape of the electric double layer capacitor using the electrolytic solution of the present invention. Examples include a film type, coin type, cylinder type, and box type.

The electric double layer capacitor of the present invention is manufactured by placing a separator between two polarizable electrodes for a capacitor, impregnating the polarizable electrodes with the electrolytic solution of the present invention as a drive electrolytic solution, and packing the fabricated body in an exterior case.

Although there are no particular restrictions to the polarizable electrodes, polarizable electrodes formed from a porous carbon material such as activated carbon powder and carbon fiber; a noble metal oxide material such as ruthenium oxide; and a conductive high molecular material such as polypyrrole and polythiophene are preferable, with a porous carbon material being particularly preferable.

As shown in FIG. 1, one example of the electric double layer capacitor has a structure comprising a first electrode and a second electrode, each formed from a sheet-type carbon electrode, placed on either side of a separator, impregnated with an electrolytic solution, and sealed in a first container and a second container which are electrically disconnected by a non-conductive material.

In the electric double layer capacitor 1 of FIG. 1, the first electrode is represented by 2, the second electrode is represented by 3, the first container is represented by 4, the second container is represented by 5, the separator is represented by 6, and the non-conductive material is represented by 7. In the electric double layer capacitor 1 of FIG. 1, the first electrode 2 is a negative electrode 2 and the second electrode 3 is a positive electrode 3.

There are no limitations to the material used for the first container 4 and the second container 5 as long as it is a conductive material that will not corrode in the presence of the electrolytic solution. Examples include aluminum and stainless steel.

There are no limitations to the material used for the separator 6 placed between the negative electrode 2 and the positive electrode 3 as long as the electrolytic solution can easily pass through the separator and the material is electrically and chemically stable. Preferable examples include a polyolefin nonwoven fabric, porous TEFLON, and rayon paper.

As an example of a method for fabricating the electric double layer capacitor, a method comprising filling the space inside the first container and the second container with the electrolytic solution of the present invention by impregnating the negative electrode 2 and positive electrode 3 with the electrolytic solution, and sealing the first container 4 and second container 5 with a non-conductive material 7 can be given.

As a preferable method for impregnating the electrodes with the electrolytic solution of the present invention, a method comprising vacuum drying each of the materials used in the capacitor with heating at 120 to 300° C., injecting the electrolytic solution into the negative electrode 2 and positive electrode 3 in a dry argon gas, and aging the electrodes can be given. Aging is preferably conducted by charging the device at a voltage of 2 to 3 V at room temperature for about 5 to 100 hours. Finally, defoaming under reduced pressure is preferably conducted thereby completing fabrication of the electric double layer capacitor of the present invention.

According to the present invention, drawbacks possessed by each of the solvents EC and PC can be improved, while maintaining their advantages, by mixing them at a specific ratio. Specifically, the solvent containing EC and PC at a ratio of from 20:80 to 40:60, for example, exhibits a higher solubility of a quaternary ammonium salt, enabling preparation of an electrolytic solution with a higher concentration. The resulting electrolytic solution has a lower coefficient of viscosity, superior low-temperature characteristics, and a higher conductivity in a wider temperature range. The low-temperature characteristics of the electrolytic solution can be improved even more by using a solvent of a mixing ratio of from 25:75 to 35:65.

As a result, an electrolytic solution for electric double layer capacitor which has a low coefficient of viscosity, does not coagulate at a low temperature, and possesses high electrical conductivity in a wide temperature range can be obtained.

EXAMPLES

The present invention will be described in more detail by examples, which should not be construed as limiting the present invention.

Example 1

An electrolyte, TEMA-$BF_4$, was dissolved in mixed solvents of EC and PC, each having an EC:PC ratio by volume differing from the other (EC:PC=10:90, 30:70, or 50:50), to prepare electrolytic solutions (hereinafter abbreviated as "TEMA-$BF_4$/(EC+PC)") No. 1 to 3, each having a concentration of 1.5 mol/l, as shown in Table 1.

Another electrolytic solution No.4 with a TEMA-$BF_4$ concentration of 1.5 mol/l was prepared by dissolving TEMA-$BF_4$ in PC (this electrolytic solution is hereinafter abbreviated as "TEMA-$BF_4$/PC").

The coefficients of viscosity at 30° C. and conductivities at −40° C. and 30° C. of the resulting electrolytic solutions were measured. The results are shown in Table 2.

TABLE 1

| Electrolytic solution No. | Composition of electrolytic solution | Electrolyte concentration (mol/l) |
|---|---|---|
| 1 | TEMA-$BF_4$/(EC + PC) EC:PC = 10:90 | 1.5 |
| 2 | TEMA-$BF_4$/(EC + PC) EC:PC = 30:70 | 1.5 |
| 3 | TEMA-$BF_4$/(EC + PC) EC:PC = 50:50 | 1.5 |
| 4 | TEMA-$BF_4$/PC EC:PC = 0:100 | 1.5 |

TABLE 2

| Electrolytic solution No. | Coefficient of viscosity 30° C. (mPa · s) | Conductivity (mS/cm) −40° C. | Conductivity (mS/cm) 30° C. |
|---|---|---|---|
| 1 | 4.0 | 0.90 | 18.23 |
| 2 | 3.4 | 1.59 | 18.64 |
| 3 | 3.0 | Coagulated | 19.01 |
| 4 | 4.1 | 0.82 | 18.04 |

The results of Table 2 indicate that as compared with the electrolytic solution No. 4 in which only PC was used as a solvent, the electrolytic solutions of Nos. 1 to 3 in which mixed solvents of EC and PC were used possessed a lower coefficient of viscosity and higher conductivity in a wide temperature range.

Although the electrolytic solution No. 3 in which a mixed solvent with an EC:PC ratio of 50:50 was used coagulated at −40° C., the electrolytic solutions No. 1 and No.2 in which the mixed solvent had EC:PC ratios of 10:90 and 30:70, respectively, exhibited excellent low-temperature characteristics without coagulating at −40° C., while having sufficient conductivity.

As compared with the electrolytic solution No. 1, the electrolytic solution No.2 had a lower coefficient of viscosity and higher conductivity.

Based on these results, the electrolytic solutions No. 1 and No.2, particularly the electrolytic solution No.2, were shown to have excellent low-temperature resistance and thus are usable as capacitor electrolytic solutions for cold districts.

Example 2

As a polarizable electrode, 90 mass % of activated carbon powder (particle diameter: 20 μm; specific surface area: 2,000 $m^2$/g) and 10 mass % of polytetrafluoroethylene powder were kneaded and rolled with a roller to form a sheet having a thickness of 0.4 mm. Disk-shaped electrodes with a diameter of 13 mm were punched from the sheet.

A polypropylene separator was placed between two of the above disk-shaped electrodes, the electrodes were impregnated with the electrolytic solution No.2 prepared in Example 1 (TEMA-BF4/(EC+PC), EC:PC=30:70) under vacuum and placed in a stainless steel case, and the case was sealed by applying a stainless steel cap with a gasket to integrate the case and cap, thereby obtaining a coin type electric double layer capacitor with a rated voltage of 2.7 V and an electrostatic capacity of 1.5 F.

A long-term reliability test was conducted by applying a voltage of 2.7 V to the obtained capacitor for 1,000 hours in a thermostatic vessel at 70° C.

The values of electrostatic capacity and internal resistance at 30° C. and −20° C. at the start and completion of the long-term reliability test are shown in Table 3. The electrostatic capacity was determined from the voltage gradient when the capacitor was discharged at 1 mA after charging the capacitor at a voltage of 2.7 V for one hour. The values in Table 3 are averages of 15 sample measurements.

An electric double layer capacitor was prepared and evaluated in the same manner as above using the electrolytic solution No. 4 (TEMA-BF4/PC) prepared in Example 1. The results are shown in Table 3.

TABLE 3

| Electrolytic solution | Voltage application | Electrostatic capacity (F) | | | Internal resistance (mΩ) | | |
|---|---|---|---|---|---|---|---|
| | | 30° C. | −20° C. | Decrease | 30° C. | −20° C. | Increase |
| No. 2 | Start | 319 | 301 | 5.6% | 11.2 | 28.0 | 150% |
| No. 2 | After 1000 hr | 297 | 278 | 6.4% | 21.3 | 68.1 | 220% |
| No. 4 | Start | 308 | 261 | 15.3% | 13.2 | 45.8 | 247% |
| No. 4 | After 1000 hr | 281 | 234 | 16.7% | 25.9 | 91.3 | 253% |

As shown in Table 3, the capacitor prepared by using a conventional electrolytic solution (electrolytic solution No.4) exhibited a high rate of electrostatic capacity decrease and internal resistance increase during operation at a low temperature, whereas the capacitor prepared by using the electrolytic solution of the present invention (electrolytic solution No. 2) exhibited a low rate of electrostatic capacity decrease and internal resistance increase during operation at a low temperature, indicating superior electrical characteristics over a wide temperature range.

In addition, the electrolytic solution No. 2 exhibited a low rate of electrostatic capacity decrease and internal resistance increase at a low temperature even after applying a charge at 2.7 V for 1,000 hours in a thermostatic vessel at 70° C., indicating that the electrolytic solution exhibits superior electrical characteristics over a wide temperature range and excellent long-term reliability.

Example 3

Spiro-(1,1')bipyrrolidinium chloride was synthesized by reacting pyrrolidine with dichlorobutane as a halogenating agent and neutralized with addition of an equivalent amount of tetrafluoroboric acid. After the reaction, the reaction mixture was evaporated under reduced pressure to remove water and hydrogen chloride, thereby obtaining spiro-(1,1')bipyrrolidinium tetrafluoroborate ($SBP-BF_4$).

Next, $SBP-BF_4$, as an electrolyte, was dissolved in mixed solvents of EC and PC, each having a different EC:PC ratio (EC:PC=10:90, 30:70, or 50:50), to prepare electrolytic solutions (hereinafter abbreviated as "SBP-BF4/(EC+PC)") No. 5 to 7, each having a concentration of 1.5 mol/l. Another electrolytic solution No. 8 with an $SBP-BF_4$ concentration of 1.5 mol/l was prepared by dissolving $SBP-BF_4$, as an electrolyte, in PC (this electrolytic solution is hereinafter abbreviated as "SBP-BF4/PC").

The coefficients of viscosity at 30° C. and conductivities at −40° C. and 30° C. of the electrolytic solutions No. 5 to No. 7 shown by Table 4 and the electrolytic solution No. 4 (TEMA-BF4/PC) prepared in the same manner as in Example 1 were measured. The results are shown in Table 5.

TABLE 4

| Electrolytic solution No. | Composition of electrolytic solution | Electrolyte concentration (mol/l) |
|---|---|---|
| 5 | SBP-BF4/(EC + PC) EC:PC = 10:90 | 1.5 |
| 6 | SBP-BF4/(EC + PC) EC:PC = 30:70 | 1.5 |
| 7 | SBP-BF4/(EC + PC) EC:PC = 50:50 | 1.5 |
| 8 | SBP-BF4/PC EC:PC = 0:100 | 1.5 |
| 4 | TEMA-BF4/PC EC:PC = 0:100 | 1.5 |

TABLE 5

| Electrolytic solution No. | Coefficient of viscosity 30° C. (mPa · s) | Conductivity (mS/cm) | |
|---|---|---|---|
| | | −40° C. | 30° C. |
| 5 | 4.0 | 0.98 | 19.19 |
| 6 | 3.4 | 1.59 | 19.74 |
| 7 | 3.0 | Coagulated | 20.56 |
| 8 | 4.1 | 0.86 | 18.61 |
| 4 | 4.1 | 0.82 | 18.04 |

The results of Table 5 indicate that as compared with the electrolytic solutions of No. 4 and No. 8 in which only PC was used as a solvent, the electrolytes of Nos. 5 to 7 in which mixed solvents of EC and PC were used possessed a lower coefficient of viscosity and higher conductivity in a wide temperature range.

Although the electrolytic solution No. 7, in which a mixed solvent with an EC:PC ratio of 50:50 was used, coagulated at −40° C., the electrolytic solutions No. 5 and No. 6 in which the mixed solvent had EC:PC ratios of 10:90 and 30:70, respectively, exhibited excellent low-temperature characteristics without coagulating at −40° C., while having sufficient conductivity.

As compared with the electrolytic solution No. 5, the electrolytic solution No. 6 had a lower coefficient of viscosity and higher conductivity.

Based on these results, the electrolytic solutions No. 5 and No. 6, particularly the electrolytic solution No. 6, were shown to have excellent low-temperature resistance and thus can be used as capacitor electrolytic solutions for cold districts.

Example 4

A disk-like electrode was prepared in the same manner as in Example 2.

A polypropylene separator was placed between two of the above disk-shaped electrodes, the electrodes were impregnated with the electrolytic solutions No. 6 or No. 8 prepared in Example 3 or the electrolytic solution No. 4 prepared in Example 1 under vacuum and placed in a stainless steel case, and the case was sealed by applying a stainless steel cap via a gasket to integrate the case and cap, thereby obtaining a coin type electric double layer capacitor with a rated voltage of 2.7 V and an electrostatic capacity 1.5 F.

A long-term reliability test was conducted by applying a voltage of 2.7 V for 1,000 hours in a thermostatic vessel at 70° C. The values of electrostatic capacity and internal resistance at 30° C. and −20° C. at the start and completion of the long-term reliability test are shown in Table 6.

The electrostatic capacity was determined from the voltage gradient when the capacitor was discharged at 1 mA after charging the capacitor at a voltage of 2.7 V for one hour. The values in Table 6 are averages of 15 sample measurements.

TABLE 6

| Electrolytic solution | Voltage application | Electrostatic capacity (F) | | | Internal resistance (mΩ) | | |
|---|---|---|---|---|---|---|---|
| | | 30° C. | −20° C. | Decrease | 30° C. | −20° C. | Increase |
| No. 6 | Start | 325 | 301 | 7.4% | 11.3 | 30.8 | 173% |
| No. 6 | After 1000 hr | 313 | 293 | 6.5% | 20.9 | 62.4 | 199% |
| No. 8 | Start | 312 | 282 | 9.6% | 12.4 | 40.9 | 230% |
| No. 8 | After 1000 hr | 291 | 259 | 11.0% | 23.1 | 80.5 | 248% |
| No. 4 | Start | 308 | 261 | 15.3% | 13.2 | 45.8 | 247% |
| No. 4 | After 1000 hr | 281 | 234 | 16.7% | 25.9 | 91.3 | 253% |

As shown in Table 6, the capacitor prepared by using a conventional electrolytic solution (electrolytic solution No.4) and the electrolytic solution in which only PC was used as a solvent (electrolytic solution No. 8) exhibited a high rate of electrostatic capacity decrease and internal resistance increase during operation at a low temperature, whereas the capacitor prepared by using the electrolytic solution of the present invention (electrolytic solution No.6) exhibited a low rate of electrostatic capacity decrease and internal resistance increase during operation at a low temperature, indicating superior electrical characteristics over a wide temperature range. In addition, the electrolytic solution No.6 exhibited a low rate of electrostatic capacity decrease and internal resistance increase at a low temperature even after applying a charge at 2.7 V for 1,000 hours in a thermostatic vessel at 70° C., indicating that the electrolyte exhibits superior electrical characteristics over a wide temperature range and excellent long-term reliability.

INDUSTRIAL APPLICABILITY

The electrolytic solution for electric double layer capacitors of the present invention in which a quaternary ammonium salt is dissolved as an electrolyte in a mixed solvent of EC and PC has a low coefficient of viscosity, superior low-temperature characteristics, and a high conductivity over a wider temperature range.

Furthermore, due to the capability of exhibiting excellent electrical characteristics and long-term reliability over a wide temperature range, the electric double layer capacitor prepared using this electrolytic solution can be used in a wide range of industries from miniature electronic instruments to large automobiles.

The invention claimed is:

1. An electrolytic solution for an electric double layer capacitor comprising a quaternary ammonium salt given by the following formula (1) in a mixed solvent comprising ethylene carbonate and propylene carbonate,

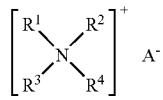
(1)

wherein:

$R^1$ and $R^2$, and $R^3$ and $R^4$ form a pyrrolidine ring or a piperidine ring in combination, and $A^-$ represents a counter anion; and a ratio by volume of ethylene carbonate to propylene carbonate is from 20:80 to 40:60.

2. The electrolytic solution for an electric double layer capacitor according to claim 1, wherein the quaternary ammonium salt comprises at least one compound selected from the group consisting of spiro-(1,1')-bipyrrolidinium tetrafluoroborate and piperidine-1-spiro-1'-pyrrolidinium tetrafluoroborate.

3. The electrolytic solution for an electric double layer capacitor according to claim 1, wherein $A^-$ is a tetrafluoroboric acid anion.

4. The electrolytic solution for an electric double layer capacitor according to claim 1, wherein the quaternary ammonium salt comprises spiro-(1,1')-bipyrrolidinium tetrafluoroborate.

5. An electric double layer capacitor comprising the electrolytic solution according to claim 1.

6. An electric double layer capacitor, comprising:

a first container;

a first electrode electrically connected to the first container;

a second container;

a second electrode electrically connected to the second container; and a separator separating the first electrode and the second electrode;

wherein:

a space inside the first container and the second container is filled with the electrolytic solution according to claim 1; and the first container and the second container are sealed with a nonconductive material to prevent electrical connection between the containers.

* * * * *